(12) United States Patent
Romeo

(10) Patent No.: US 8,293,312 B2
(45) Date of Patent: Oct. 23, 2012

(54) CONCENTRATED TOMATO PRODUCTS

(75) Inventor: Aurelio Romeo, Rome (IT)

(73) Assignee: Zanichelli Ricerche S.R.L., Rome (IT)

( * ) Notice: Subject to any disclaimer, the term of this patent is extended or adjusted under 35 U.S.C. 154(b) by 1202 days.

(21) Appl. No.: 10/588,375

(22) PCT Filed: Jan. 25, 2005

(86) PCT No.: PCT/EP2005/000687
§ 371 (c)(1),
(2), (4) Date: Aug. 2, 2006

(87) PCT Pub. No.: WO2005/074723
PCT Pub. Date: Aug. 18, 2005

(65) Prior Publication Data
US 2008/0206428 A1 Aug. 28, 2008

(30) Foreign Application Priority Data

Feb. 6, 2004 (IT) ............................... MI2004A0189

(51) Int. Cl.
*A23C 19/00* (2006.01)
(52) U.S. Cl. .................. 426/582; 426/589; 426/615
(58) Field of Classification Search ..................... None
See application file for complete search history.

(56) References Cited

U.S. PATENT DOCUMENTS

| 1,874,181 A | 8/1932 | Gavin |
| 4,840,119 A | 6/1989 | Caldi |
| 2003/0224100 A1 | 12/2003 | De La Cuadra et al. |

FOREIGN PATENT DOCUMENTS

| WO | WO-97/48287 A1 | 12/1997 |
| WO | WO-03/024243 A2 | 3/2003 |
| WO | WO-2004/017759 A2 | 3/2004 |

OTHER PUBLICATIONS

"Lowcountry Aioli" in Gourment, Nov. 2000, www.epicurious.com.*
Youssef M M et al., Database FSTA 'online! International Food Information Service (IFIS), Frankfurt-Main, DE; 1975, XP002327482.

* cited by examiner

*Primary Examiner* — Elizabeth Gwartney
(74) *Attorney, Agent, or Firm* — Birch Stewart Kolasch & Birch, LLP

(57) ABSTRACT

A tomato composition obtained from tomato juice having the following composition in percentage by weight: dry residue>20% up to 99%, water<80% down to 1%; 100% being the sum of the two components, wherein the among of water insoluble solids in the dry residue ranges in percentage by weight from 18% to 70%.

38 Claims, No Drawings

CONCENTRATED TOMATO PRODUCTS

The present invention relates to new tomato products having an improved saucing power in particular on pasta, having an improved preservation power.

Tomato products, prepared from the tomato juice obtained by fruit trituration, seed and peel separation, are known in the prior art. The tomato juice is an aqueous suspension of insoluble solids in an aqueous solution wherein organic and inorganic substances are dissolved.

From the obtained juice other products such as tomato passatas and tomato concentrates can be obtained. Tomato passatas in general are obtained from juices by partial concentration. The tomato concentrates are obtained by stronger concentration processes. The methods generally used are the reverse osmosis, cryoconcentration and concentration by evaporation. By using the reverse osmosis it is necessary to operate, instead of at cold, at temperatures of about 70° C. to have a satisfactory concentration yield; furthermore it is necessary to clean and regenerate the membranes by means of chemical detergents, which must then be removed. In fact said compounds are pollutant of the tomato products, if present in traces. See C. S. Leoni "I derivati industriali del pomodoro", experimental Station for the food preserves industry in Parma, October 1993, pages 92-93. The cryoconcentration is inapplicable to the tomato juice due to the high percentage of solids in suspension, which would be separated together with ice. See page 93 of the previous quotation.

In practice the concentration by evaporation remains the method of choice to concentrate the tomato juice. See page 93 of the previous reference. This method implies juice heating. With this process a tomato product is obtained with worsened organoleptic and nutritional properties. The organoleptic variations are a caramel taste and a typical cooking ("cotto") aroma present in tomato concentrates and they are mainly due to the formation during juice concentration of hydrogen sulphide, dimethylsulphide, furfural, 3-methylmercaptopropanal, 2,4-heptadienal, acetaldehyde, phenylacetaldehyde, pyrrolidoncarboxilic acid. See S. Porretta "Il controllo delta qualitá dei derivati del pomodoro", experimental Station for the food preserves industry in Parma (1991), page 51; S. J. Kazeniac et al., J. Food Sci. 35 519 (1970); Shallenberge R. S. et al., J. Agric. Food Chem. 6, 604-605 (1958).

The nutritional variations are mainly due to the degradation of the carotenoids present in the tomato and in particular of lycopene. The tomato as such and its products have a high nutritional value deriving from the vitaminic components, and mainly from the contained carotenoids. It has been demonstrated that the tomato product consumption is associated to a risk decrease of some cancer types (prostata, pancreas, stomach). See H. Gerster, J. Am. Coll. Nutr. 1997, 16, 109-126; S. K. Clinton Nutr. Rev. 1998 56, 35-51. The previously described beneficial nutritional effects are to be ascribed to the carotenoids contained in the tomato and in particular to lycopene.

The tomato concentrates are commercially known as preseves, which are diluted before use. The commercial tomato concentrates, for example in Italy, are classified as follows:

| semiconcentrate | dry residue 12% by weight; |
|---|---|
| concentrate (C) | dry residue 18% by weight; |
| double concentrate (DC) | dry residue 28% by weight; |
| triple concentrate (TC) | dry residue 36% by weight; |

Generally the commercial concentrated products are diluted before and during the use. The saucing power of the triple concentrate (TC) as such, before dilution, is higher than that of the other commercial tomato products, concentrates included. By saucing power it is meant the product capability to stick to foods, in particular to pasta. However, as said, these concentrated products must be diluted before or during use because of their too strong taste. Consequently the advantage of the higher saucing power of these products is lost. Generally all the commercial tomato concentrates having a dry residue above 12% show such taste problem and therefore must be diluted.

If a semiconcentrate at 12% is used, since it generally should not to be diluted before use showing no problems of unpleasant taste, the saucing power is very low, even lower than the saucing power of TC as such. The tomato passatas are used as a ready base for quick sauce preparation. Generally in tomato passatas the dry residue, which can be determined as described afterwards, is lower than or equal to 10% by weight, generally comprised between 5%-7% by weight.

It was desirable to have available tomato products having besides an improved saucing power, improved organoleptic properties, also an improved preservation power, meant as lower easiness to tomato product decomposition in time and therefore an improved shelf life.

The Applicant has surprisingly and unexpectedly found tomato products solving the above mentioned technical problem, i.e. which can be used as such and which have an improved saucing power, improved organoleptic properties, i.e. devoid of any caramel taste, bitter taste, cooking ("cotto") aroma and also sour taste and furthermore they have an improved preservation power as above defined.

An object of the present invention is a composition or tomato product having the following composition (percentage by weight):

| dry residue | >20% up to 99%, |
|---|---|
| water | <80% down to 1%; | wherein the amount of water insoluble solids and water soluble solids in the dry residue ranges in percentage by weight as it follows:

water insoluble-solids from 18% to 70%, water soluble solids from 82% to 30%, being 100% the sum of the two components.

Preferably the water insoluble solids and the soluble solids in the dry residue range in percentage by weight as it follows:

| water insoluble solids: | 20%-50%, |
|---|---|
| water soluble solids: | 80%-50%. |

Still more preferably the water insoluble solids and the soluble solids in the dry residue range in percentage by weight as it follows:

| water insoluble solids: | 30%-50%, |
|---|---|
| water soluble solids: | 70%-50%. |

Preferably the dry residue and water are comprised within the following limits:

| | |
|---|---|
| dry residue | 25%-85%, more preferably 30%-80%, |
| water | 75%-15%, more preferably 70%-20%. |

The starting tomato juice for obtaining the invention product can be obtained from the fruit, or from cube or chopped tomatoes, from peeled tomatoes or from tomato passata.

The tomato products of the present invention have therefore a limited water content and an improved saucing power. Furthermore, the water content being limited, the taste is improved. A further advantage of the limited water content is that the invention tomato products can be preserved for a longer time.

The test to determine the saucing power is described in the Examples.

The total dry residue, the water soluble solids and the water insoluble solids are determined as described in the Examples.

The invention tomato products are obtainable by the process described below that includes a more thorough separation of the tomato serum from the water insoluble solids, that affords to obtain tomato products according to the invention, having a water insoluble solid content in the dry residue even up to 70%.

To further improve the taste to the invention tomato products it is possible to add and mix with lyophilized or cryo-concentrated tomato juice serum, or serum concentrated by osmosis membrane or by evaporation under vacuum. It is thus possible to obtain, for example, tomato products having a lower content of water insoluble solids in the dry residue. Preferably the water insoluble solids are between 18%-70%, preferably 20%-50%, more preferably 30%-50%, by weight, referred to the total water soluble solids+water insoluble solids being made 100%.

Therefore in the invention tomato products it is possible to adjust the ratio between the water insoluble solids and those water soluble. The Applicant has found that by varying the amount of water soluble solids present in the total solids, the taste properties of the product (more or less intense tomato taste), can be suitably dosed. The product olfactory properties (fresh tomato smell) mainly depend on the amount of water insoluble solids present in the total solids, since the water insoluble solids retain the volatile components.

As said, the tomato products of the present invention contain a reduced water amount and are particularly suitable to form compositions in admixture with foods and foodstuffs even containing a high water amount. The tomato taste is thus preserved. Examples of foods and foodstuffs having a high water content are first courses, soups, purée, sauces, juices, legumes, vegetables, yoghurts, cottage cheese and dairy products in general.

The tomato products of the present invention can also be used for preparing sauces, such as for example ketchup, chili sauce, tomato soup, etc.

The tomato products of the present invention can in particular be used as sauce for pizza, since to the leavened pasta, besides oils and fats, tomato and other components, a dairy product, for example mozzarella, having a high water, is added.

Furthermore the Applicant has found that the invention tomato products unexpectedly incorporate, for example, by mechanical mixing, without serum separation, food products containing fats. The amount of the latter products can range within wide values. The preferred highest limit being the non miscibility of the products containing fats (i.e. it is not miscible with the tomato product anymore). Examples of fat containing products are: animal and vegetable fats, solid at room temperature, such as for example butter or margarine, mayonnaise, and/or fats liquid at room temperature as for example vegetable oils, for example olive oil, and/or cheese having soft-, or fresh-grain or hard-grain and grated. Any kind of mayonnaise can be used, for example also commercial mayonnaise "light" having a lower content of fats with respect to the mayonnaise.

Therefore the tomato products of the present invention can be mixed in any ratio with foods in the form of emulsions water in oil or oil in water as, for example, mayonnaise.

Preferably the fat contained in the foodstuff is an amount higher than 10% by weight, more preferably higher than 20% by weight, on the weight of the foodstuff. Other examples of these fat containing foodstuffs are spreadable salami, spreadable ham, etc.

Generally the amount of oil which can be incorporated in the tomato composition ranges from 10 to 25% by weight referred to the weight of the starting tomato product.

Solid fats and soft-grain cheese can be incorporated in any desired amount, since the two components (soft-grain cheese and tomato product) are perfectly miscible in all ratios; the amount of solid fat and, respectively, of soft-grain cheese which can be incorporated ranges for example from 30% to 300% by weight, said percentage calculated as above mentioned.

When food fats that are solid at room temperature are used, it is preferable to heat said fats, before mixing with the tomato product of the present invention, at least up to softening point of said fats, preferably not above their melting point.

The amount of hard-grain and grated cheeses which can be mixed with the tomato products of the present invention preferably ranges from 10% to 25% by weight, said percentages calculated as above mentioned. Said compositions can be used as ready-to-use sauce since they incorporate, as said above, oil, butter and/or cheeses. To said compositions other usual ingredients of food products, such, for example, essence aromas, preservatives, etc, can be added.

The mayonnaise amount which can be incorporated in the compositions with the tomato products ranges from 90% to 20% by weight referred to the starting tomato product weight.

Generally to prepare said products, mixtures of the invention tomato products with the above mentioned foods and foodstuffs, one operates by using for instance a mixer at temperatures between 5° C. and 40° C., preferably between 10° C. and 25° C.

As said, the invention tomato products and the compositions obtained therefrom as above defined have an improved saucing power and improved organoleptic and nutritional properties in comparison with the products on the market.

The invention products, in particular the compositions of the invention tomato products obtainable as mixtures of said products with fats and/or oils and/or cheeses, can also be used as foods. For example these products can be spread on bread, as it is made for soft cheeses.

The tomato products of the present invention can, as said, be added to or mixed with other foods, also liquid foods. In this case the amount of the invention tomato products can be such to give to the final product a greater consistence than that of the starting product. Therefore by preparing mixtures of liquid foods with the tomato products of the present invention it is possible to obtain preparations having a semisolid consistence, spreadable for example on bread, which preserve the liquid food taste.

As said, the tomato products of the present invention have an improved saucing power combined with improved organoleptic properties, i.e. unlike the commercial product without a caramel, or a bitter, or a sour taste.

The Applicant has found that the amount of water insoluble solids which must be present in the tomato product to confer an improved saucing power must be at least 18% by weight with respect to the dry residue of the tomato product, preferably from 20% to 50% by weight with respect to the dry residue.

As foods to be sauced, pasta, meat, fish, vegetables, etc., can be mentioned.

The invention products show a high content of water insoluble solids. The Applicant has found that the amount of water insoluble solids in the commercial products is not higher than 15' by weight in the dry residue. For example in the fresh tomato pulp the amount of water insoluble solids is generally about 12.5% of the total tomato solids (dry residue). See in "Tomato paste, Purée, Juice & Powder" P. G. Goose, Food Trade Press Ltd 1964.

The invention tomato compositions, as said, have an improved saucing power. As it is known, in the final step in the kitchen cooking for preparing a sauce wherein fresh tomato or a tomato concentrate is used, these ingredients are mixed in a pot with fats and/or oils, aromas and other ingredients and heated. In this way lycopene is solubilized by fats and easily degraded by the concomitant effect of light and oxygen.

The invention tomato product compositions have the advantage that they can be prepared at room temperature, or at temperatures substantially lower than those usually utilized for preparing sauces in pot. Therefore the organoleptic and nutritional properties substantially remain those of the fresh tomato.

The process for obtaining the invention tomato products is described herein below. It has been found, surprisingly and unexpectedly, that it is possible to filter the tomato juice by maintaining the suspension under a slow stirring. It has been in fact observed that under said conditions, the sediment stratification on the filter does not take place, but that said sediments are incorporated in the tomato juice suspension. In fact, it is known that it is not feasible the filtering of the tomato products, in particular tomato juices and tomato passatas, since the filter is quickly occluded. The filtration process according to the present invention proceeds instead rapidly. Finally, when there is no more serum percolation, on the filter a compact mass is formed which does not stick to the filter and which can be easily recovered.

It is therefore an object of the present invention a process for preparing the tomato products of the present invention comprising the following steps:
a) separation of the tomato serum from the starting tomato product by using a separation solid-liquid apparatus wherein the mass to be filtered is maintained under a slow stirring; optionally at the end of said step one or more additions of water are made and step a) is then repeated;
b) recovery of the mass on the filter and optional addition of concentrated serum;
c) concentration and/or lyophilization of the mass recovered in b) and obtainment of a product having a residual water content lower than 80% by weight, down to 1% by weight.

Preferably the tomato juice is previously treated according to known processes, for example by "hot break", "cold break" processes, or by applying high pressures, for example of the order of 500-3,000 Atm (50.5 MPa–3.03×10$^2$ MPa), to inactivate enzymes. As starting tomato product, the tomato passata can be used.

Alternatively, as said, as starting tomato product also cube, chopped and/or peeled tomatoes can be used.

The step a) of the invention process is carried out at temperatures generally in the range 5° C.-40° C., preferably 10° C.-25° C., more preferably 10° C.-20° C., at atmospheric pressure, or by using slightly higher pressures, from 760 mm Hg (0.101 MPa) up to 900 mm Hg (0.12 MPa), or by applying pressures slightly lower than the atmospheric pressure, down to 450 mm Hg (0.06 MPa).

In step a) of the process, an apparatus equipped with stirrer, for example, centrally placed, is preferably used, said stirrer having angular speed from 1 rpm to 20 rpm, preferably from 2 rpm to 10 rpm, the stirrer blades being of a shape such that the suspension is conveyed to the central axis of the device.

Alternatively an equipment wherein the stirrer is absent can be used and it is the separation solid-liquid apparatus itself which rotates around the longitudinal central axis, the apparatus rotation speed being from 1 rpm to 20 rpm, preferably from 2 rpm to 10 rpm.

Another method to effect stirring is that to use an apparatus constituted by a sieve kept under motion, for example an oscillatory motion, preferably a nutational motion, the oscillations/minute generally being from 1 to 20 oscillations/minute, preferably from 2 to 10 oscillations/minute.

The apparatus which is preferably used in a solid-liquid separator constituted for example of a food grade stainless steel reactor, having walls with openings or slots formed for instance with woven wire cloth or with wire screens or welding screens. Alternatively the walls have holes such as punched holes or drilled holes or slot milled holes or beam perforated holes, prepared by techniques such as for example "laser perforation" or "electron beam perforation".

The width of the openings or slots, or the diameter in the case of holes, is not greater than 0.1 mm and preferably not lower than 0.005 mm. The slots length is not critical. For example said length can range from 30 cm to 2 meters, depending on the total volume of the tomato juice to be treated. When the separation solid-liquid apparatus has a bottom wall, this is preferably made of a plate without slots or holes.

Preferably the solid-liquid separator has a cylindrical section.

The apparatus is furthermore equipped, as said, with a device for stirring. Stirring must be very slow, the angular speed in the case of a mechanical stirrer generally being from 1 to 20 rpm, preferably from 2 to 10 rpm, stirring being such that the solid is conveyed in the separator central zone (with reference to the longitudinal axis). It has been found that this kind of stirring prevents the solid from adhering and accumulating on the walls, so as to avoid the formation of an occlusive layer on the separator walls during the processing.

The distance between the walls and the stirrer blades generally ranges from 0.5 to 2 cm.

The solid-liquid separation in the process of the present invention ends when in the separator there is a compact mass which does not separate any longer tomato serum.

Unexpectedly during this step there is no clogging of the separators having holes or openings of the above mentioned sizes, since unexpectedly a compact mass is formed, as said above. This result could be not foreseen since one would expect the formation of a product layer adhering to the walls and substantially impermeable.

The invention process which uses the above described apparatus has a very high productivity since there is no product clogging on the screens with consequent process downtime for the separator cleaning.

An alternative apparatus usable for the solid-liquid separation of the process according to the present invention, as said, is formed of a concave- or flat-shaped sieve, having holes diameter or slots width not greater than 0.1 mm, preferably not lower than 0.005 mm, wherein the mass to be filtered is loaded. The mass in the sieve is kept under an oscillatory motion, until a compact mass is formed, which does not separate the serum any longer. The compact mass is easily recovered since it does not adhere to the sieve. The temperature conditions are those indicated above when the separator with stirrer is used; preferably atmospheric pressure is used. The number of oscillations/minute are those indicated above.

Another apparatus usable in step a) is constituted of a cylinder wherein the walls are for example of food grade stainless steel and have slots or holes of the same kind as those mentioned for the above described separator. The width of the openings or slots or the diameter in the case of holes, is not greater than 0.1 mm and preferably not lower than 0.005 mm. Said cylinder is fixed and has inside a stirrer in the form of an Archimedean screw, or the apparatus is rotating around the longitudinal central axis and has the shape of an helix wound about its own central axis. In this case there is no mechanical stirrer. The angular speed is generally from 2 to 10 rpm. The process is preferably carried out under the temperature and pressure conditions above described for the process in which the separator with stirrer is used. Preferably the cylinder is in an horizontal position, and has a diameter which can for example range from 30 cm to 1 meter, length from 2 meters to 20 meters. Preferably the length ranges from 2 meters to 5 meters when the apparatus works in a discontinuous way. The length is preferably about 20 meters when the apparatus works in a continuous way. When one works in a discontinuous way, the mass to be filtered is let pass in the cylinder, even repeating the process more times, until a compact mass is formed and there is no separation of tomato serum any longer.

The separator can be of metal, steel included, or also of plastic material. Preferably the apparatus is made of food grade stainless steel. The usable plastic materials can be constituted by propylene homopolymers and copolymers, ethylene homopolymers and copolymers, etc.

At the end of the filtration step a) the tomato mass is recovered (step b)) to adjust the water soluble/insoluble solids ratio at the desired value.

The concentration step c) is carried out at temperatures not higher than 40° C., for example by concentration under vacuum, or also by lyophilization. In this case the residual water content in the obtained product can be very low, even of the order of 1% by weight.

The invention process is preferably carried out under sterile conditions or alternatively the tomato product obtained with the invention process can be sterilized. In this case sterilization can be carried out by conventional methods, preferably by tindalization, preferably at high pressure, for example in the range 5,000-7,000 atm.

The process according to the present invention can optionally be carried out by operating under inert gas atmosphere, for example nitrogen. In this way it is avoided the contact between the product being processed and the oxygen in the presence of light, and therefore avoided the degradation of some nutritional tomato components. This way of operating can be requested when the process temperature, for unforeseen events, results higher than 40° C., preferably higher than 25° C. In this way no lycopene losses occur in the processing.

By operating with the separation process according to the present invention, carotenoids, lycopene and the other liposoluble vitaminic components included, remain in the solid mass of step b) which has separated from the serum.

The tomato serum percolated from the separator, containing a large part of the water soluble solids of tomato juice, is generally recovered by lyophilization or concentration with known methods, for example cryoconcentration and concentration under vacuum.

When operating with the process of the present invention starting from tomato juice suspensions obtained from partially ripened tomatoes, the slots width, or the holes diameter of the separation solid-liquid apparatus in step a) can even reach values higher than 0.1 mm but not higher than 0.5 mm, preferably about 0.3 mm.

As said, the separated serum contains a great part of the water soluble solids contained in the tomato juice. The Applicant has found that the organoleptic properties (taste) of the invention tomato products can be modified by adding water soluble solids. This addition is carried out by mixing the invention tomato products with lyophilized or concentrated tomato serum. Generally serum is cold concentrated by cryoconcentration, or can be treated with the other above described methods.

With the process according to the present invention, tomato products are obtained having a water insoluble solid content as above indicated.

To the invention tomato products, as said, it is possible to add serum to further improve the taste. It is thus possible to obtain, for example, tomato products having a lower content of water insoluble solids in the dry residue, preferably comprised between 18 and 30%.

The tomato products according to the present invention maintain the organoleptic and nutritional properties of the fresh tomato. Therefore in the present invention products there are no variations of the organoleptic properties, as for example it happens in the tomato products of the prior art wherein it is noticeable a caramel taste and/or a cooking ("cotto") smell.

Also the nutritional properties remain unaltered, since there is no alteration of the carotenoids, in particular of the lycopene, as it occurs instead in the commercial products.

The tomato compositions of the present invention can have a more or less strong tomato taste, depending on the water soluble/insoluble solids ratio. The point to be stressed is that said organoleptic property for the commercial tomato products depends on the variety of tomatoes used and on the fruit ripeness. Unexpectedly, with the process of the present invention it is possible to obtain tomato products having a constant taste from one production batch to another. This is a remarkable result from a commercial point of view. The Applicant has found that the tomato taste depends on the ratio between soluble and insoluble solids. Therefore according to the present invention it is possible to prepare tomato products which more favourably meet the individual consumer's taste, since, as said, it is possible to prepare compositions having a different ratio soluble solids/insoluble solids.

The invention concentrated products can be used as such. Optionally they can be diluted before or during the use, preferably the dry amount in percent by weight being comprised in the range >20%-99%, preferably 25%-85%, more preferably 30%-80%. The saucing power of the invention concentrated products, for example between 25% and 99% by weight not diluted, is higher than that of the other commercial tomato products, concentrates included, having a lower dry residue content. In fact the invention concentrated products must not be diluted before or during the use since they have no too strong or too marked taste.

The following not limiting Examples illustrate the invention.

EXAMPLES

Characterization Methods

Determination of the Saucing Power of a Tomato Product According to the Invention Materials:

tomato product to be tested, vegetable oil, preferably olive oil, full length, not broken spaghetti No. 12 De Cecco trade mark with cooking time indicated by the manufacturer 12 minutes, sea salt.

90 g of tomato product to be tested and 10 g of vegetable oil (condiment total weight: 100 g) are introduced into a vessel, preferably a plastic vessel, previously weighed and having 1 liter capacity.

70 g of spaghetti are cooked apart, in 1 liter of water containing 5 g of sea salt, for the time indicated on the package. At the end the cooked spaghetti are strained until no drops form any longer.

The cooked spaghetti are added to the condiment previously prepared in the plastic vessel and by a fork they are carefully mixed, slowly for 5 minutes. The vessel is then put on a boiling water bain-marie for 5 minutes, without mixing. From the vessel with a fork the spaghetti are taken in a number of 2-3 at a time and without shaking them, it is let fall in the vessel the condiment which tends to immediately detach.

In the plastic vessel it remains the condiment which has not adhered to the spaghetti. Lastly the plastic vessel is weighed and in this way it is determined the weight of the condiment which has not adhered to the pasta. The difference to 100 (initial condiment weight) gives the amount which has remained attached to the pasta ($Q_A$).

The saucing power is defined on the basis of the following equation:

$$\text{Saucing power} = \frac{Q_A \times 10}{100}$$

Determination of the Dry Residue: Total Solids

The total dry residue is determined in the tomato juice by using a vacuum stove (vacuum degree not higher than 450 mm Hg-59.85 KPa) at 70° C. The method is as described in Journal Officiel des Communitées Europeenes 7.6.86 L.153 pages 5-6.

Determination of the Water Content

The water content is determined by the weight difference between the total weight and the dry residue.

Determination of Water Soluble Solids

The determination of water soluble solids has been carried out by using an Abbe refractometer (Brix degrees), as described in Journal Officiel des Communitées Europeenes 7.6.86 L.153 pages 6-9.

Determination of Water Insoluble Solids

The determination of water insoluble solids has been carried out by calculating the weight difference between the dry residue and that of the water soluble solids (Brix value), as reported in "Tomato Production, Processing and Technology, 3rd Ed." by W. A. Gould, CTI Publications, Inc., 1992 page 317.

Example 1

Preparation of a Tomato Product

The processing is carried out under sterile conditions.

10 Kg of tomato juice from partially ripened fruits (free from seeds and peels), previously hot break treated to inactivate enzymes, are portionwise transferred in a 10 litre separator equipped with stirrer. The separator is constituted by stainless steel screens having an opening of 0.5 mm. The bottom wall of the separator has no slots or holes. The stirrer shape is such that the solid in the separator is conveyed towards the central zone of the separator. The distance between the separator walls and the stirrer blades is of about 0.5 cm. The stirring (3 rpm) is started and it is operated at a temperature in the range 5° C.-10° C.

After 3 hours stirring is reduced to 2 rpm. It is noticed that the mass in the separator has become compact and homogeneous. After 7 hours from the process beginning, no serum is any longer separated from the mass in the separator. Stirring is interrupted and the obtained product is discharged. 2.7 kg of tomato product are recovered.

The analytical characteristics of the product are the following:

dry residue: 10% by weight;
water: 90%;
water insoluble solids: 50% by weight with respect to the dry residue;
water soluble solids: 50% by weight with respect to the dry residue.

Example 2

1 kg of the tomato product obtained in the previous Example is put in a lyophilizer. After product freezing one proceeds to lyophilization. At the end the tomato product (102 g) is recovered under the form of powder.

The analytical characteristics of the product are the following:

dry residue: 98% by weight;
water: 1%;
water insoluble solids: 50% by weight with respect to the dry residue;
water soluble solids: 50% by weight with respect to the dry residue.

Example 3

500 g of the tomato product obtained in the Example 1 are concentrated in a concentration apparatus wherein a vacuum of about 5 mm Hg is made at a temperature of 35° C., stirring the mass at intervals.

The mass weight in the concentration apparatus is controlled. When the weight is about the 50% of the initial weight, the process is interrupted, obtaining 240 g of product.

The analytical characteristics of the product are the following:

dry residue: 21% by weight;
water: 79;
water insoluble solids: 50% by weight with respect to the dry residue;
water soluble solids: 50% by weight with respect to the dry residue.

The invention claimed is:

1. A tomato product having the following composition (percentage by weight):
   dry residue greater than 20% and up to 80%,
   water less than 80% and down to 20%,
   100% being the sum of the two components;
   wherein the amount of water insoluble solids and water soluble solids in the dry residue ranges in percentage by weight as follows:
   water insoluble solids from 18% up to 30%,
   water soluble solids from 82% down to 70%.

2. A composition comprising the tomato product according to claim 1 in admixture with lyophilized, or cryoconcentrated, or concentrated tomato juice serum, said mixtures having a water insoluble content between 18%-30%.

3. A sauce comprising the tomato product of claim 1.

4. A composition comprising the tomato product of claim 1 in admixture with foods.

5. The composition according to claim 4, wherein said foods are selected from the following: first courses, soups, purée, sauces, juices, legumes, vegetables, yoghurts, cottage cheese and dairy products.

6. The composition according to claim 4, wherein the foods are selected from the group consisting of animal and vegetable fats, which are solid at room temperature; fats, which are liquid at room temperature, and cheese having soft- or fresh-grain or hard-grain and grated.

7. The composition according to claim 4, wherein the foods are water in oil or oil in water emulsions.

8. The composition according to claim 6, wherein the amount of oil ranges from 10 to 25% by weight of the weight of the tomato product present; the amount of solid fats and of soft-grain cheese ranges from 30% to 300% by weight of the weight of the tomato product present.

9. The composition according to claim 6, wherein the amount of hard-grain and grated cheese ranges from 10% to 25% by weight of the weight of the tomato product present.

10. The composition according to claim 7, further comprising mayonnaise, wherein an amount of the mayonnaise ranges from 90% to 20% by weight of the weight of the tomato product present.

11. The composition according to claim 4, wherein the foods are butter or margarine.

12. The composition according to claim 4, wherein the food is mayonnaise.

13. The composition according to claim 4, wherein the foods used are vegetable oils.

14. A method of using a condiment on foods, which comprises applying the tomato product according to claim 1 to a food.

15. A process for preparing a tomato product according to claim 1 comprising the following steps:
   a) separating tomato serum from a starting tomato product by filtering the starting tomato product using a solid-liquid separation apparatus so as to form a compact mass on a filter, wherein the starting tomato product is maintained under a slow stirring by a stirrer having an angular speed from 1 to 20 rpm, at a temperature in the range of 5-40° C., for a time until a compact mass is formed;
   b) recovering the compact mass on the filter;
   c) concentrating and/or lyophilizing the compact mass recovered in b) and obtaining a product having a residual water content lower than 80% by weight, down to 20% by weight.

16. The process according to claim 15, wherein the starting tomato product is selected from the group consisting of tomato juice, tomato passatas, tomato cubes, chopped tomatoes, and peeled tomatoes.

17. The process according to claim 15, wherein step a) is carried out under atmospheric pressure, or by using slightly higher pressures, from 760 mm Hg (0.101 MPa) up to 900 mm Hg (0.12 MPa), or by applying pressures slightly lower than atmospheric pressure, down to 450 mm Hg (0.06 MPa).

18. The process according to claim 15, wherein in step a) the solid-liquid separation apparatus is equipped with a centrally placed stirrer having stirrer blades being of a shape such that a suspension being stirred is conveyed to the central axis of the apparatus.

19. The process according to claim 15, wherein a solid-liquid separation apparatus is used which rotates around the longitudinal axis.

20. The process according to claim 15, wherein the solid-liquid separation apparatus is constituted by a sieve kept under an oscillatory motion or a nutational motion, wherein the oscillatory motion is from 1 to 20 oscillations/minute.

21. The process according to claim 15, wherein the solid liquid separation apparatus is constituted of a reactor having walls with openings or slots formed with woven wire cloth or with wire screens or welding screens; or the walls have punched holes or drilled holes or slot milled holes or beam perforated holes.

22. The process according to claim 21, wherein the width of the openings or slots, or the diameter in the case of holes, is not greater than 0.1 mm and not lower than 0.005 mm, the length of the slots being between 30 cm and 2 meters.

23. The process according to claim 15, wherein in step a) a cylinder is used which is fixed and has inside a stirrer in the form of an Archimedean screw, or the apparatus is rotating around the longitudinal central axis and has the shape of an helix wound about its own axis, the angular speed being from 2 to 10 rpm.

24. The process according to claim 23, wherein the cylinder has a diameter ranging from 30 cm to 1 meter and length from 2 meters to 20 meters.

25. The process according to claim 15, wherein the solid-liquid separation apparatus is of metal or plastic material.

26. The process according to claim 15 carried out under sterile conditions, or wherein the obtained tomato product is sterilized.

27. The process according to claim 15, wherein the starting tomato product is a tomato juice suspension and when said tomato juice suspension is obtained from partially ripened fruits are used, a width of slots, or diameter of holes of the solid-liquid separation apparatus in step a) is higher than 0.1 mm but not higher than 0.5 mm.

28. A method for improving the saucing power of foods, which comprises admixing foods with a tomato product having the following composition (percentage by weight):
   dry residue greater than 20% and up to 85%,
   water less than 80% and down to 15%,
   100% being the sum of the two components;
   wherein the amount of water insoluble solids and water soluble solids in the dry residue ranges in percentage by weight as follows:
   water insoluble solids from 18% to 70%,
   water soluble solids from 82% down to 30%.

29. A method of using a condiment on foods which comprises admixing foods with a tomato product having the following composition (percentage by weight):
   dry residue greater than 20% and up to 85%,
   water less than 80% down to 15%, 100% being the sum of the two components;
wherein the amount of water insoluble solids and water soluble solids in the dry residue ranges in percentage by weight as follows:
water insoluble solids from 18% to 70%,
water soluble solids from 82% down to 30%.

30. The process according to claim 15, wherein in step a) the starting tomato product is tomato juice and the tomato juice is previously treated by a hot break or cold break process.

31. A process for preparing the tomato products according to claim 1 comprising the following steps:
  a) separating tomato serum from a starting tomato product by filtering the starting tomato product using a solid-liquid separation apparatus to form a compact mass on a filter, wherein the starting tomato product is maintained under a slow stirring by a stirrer having an angular speed from 1 to 20 rpm, at a temperature in the range of 5-40° C., for a time until a compact mass is formed;
  b) optionally adding one or more additions of water and repeating step a);
  c) recovering the compact mass on the filter and optionally adding concentrated serum;
  d) concentrating and/or lyophilizing the compact mass recovered in c) and obtaining of a product having a residual water content lower than 80% by weight, down to 15% to 20% by weight.

32. A process for preparing the tomato products according to claim 1 comprising the following steps:
  a) separating tomato serum from a starting tomato product by filtering the starting tomato product using a solid-liquid separation apparatus, wherein the starting tomato product is maintained under a slow stirring by a stirrer having an angular speed from 1 to 20 rpm, at a temperature in the range of 5-40° C., for a time until a compact mass is formed on a filter;
  b) recovering the compact mass on the filter and adding concentrated serum;
  c) concentrating and/or lyophilizing the compact mass recovered in b) and obtaining a product having a residual water content lower than 80% by weight, down to 20% by weight.

33. A process for preparing tomato products according to claim 1 comprising the following steps:
  a) separating tomato serum from a starting tomato product by filtering the starting tomato product using a solid-liquid separation apparatus, wherein the starting tomato product is maintained under a slow stirring by a stirrer having an angular speed from 1 to 20 rpm, at a temperature in the range of 5-40° C., for a time until a compact mass is formed;
  b) adding one or more additions of water and repeating step a);
  c) recovering the compact mass on the filter;
  d) concentrating and/or lyophilizing the compact mass recovered in c) and obtaining a product having a residual water content lower than 80% by weight, down to 20% by weight.

34. The process according to claim 31, wherein in step a) the starting tomato product is selected from the group consisting of tomatoes, tomato juice, tomato passatas, tomato cubes, chopped tomatoes, and peeled tomatoes.

35. The process according to claim 16, wherein the tomato juice is treated with a hot break or cold break process.

36. A tomato product,
  wherein said tomato product is made according to the method of claim 15 and wherein said tomato product has the following composition (percentage by weight):
  dry residue greater than 20% and up to 85%,
  water less than 80% and down to 15%,
  100% being the sum of the two components;
  wherein the amount of water insoluble solids and water soluble solids in the dry residue ranges in percentage by weight as follows:
  water insoluble solids from 18% to 70%,
  water soluble solids from 82% down to 30%.

37. A method according to claim 28 wherein the tomato product has the following composition (percentage by weight):
  dry residue greater than 20% and up to 80%,
  water less than 80% and down to 20%,
  100% being the sum of the two components;
  wherein the amount of water insoluble solids and water soluble solids in the dry resident ranges in percentage by weight as follows:
  water insoluble solids from 18% to 30%,
  water soluble solids from 82% down to 70%.

38. A method according to claim 29 wherein the tomato product has the following composition (percentage by weight);
  dry residue greater than 20% and up to 80%,
  water less than 80% and down to 20%,
  100% being the sum of the two components;
  wherein the amount of water insoluble solids and water soluble solids in the dry residue ranges in percentage by weight as follows:
  water insoluble solids from 18% to 30%,
  water soluble solids from 82% down to 70%.

* * * * *